UNITED STATES PATENT OFFICE.

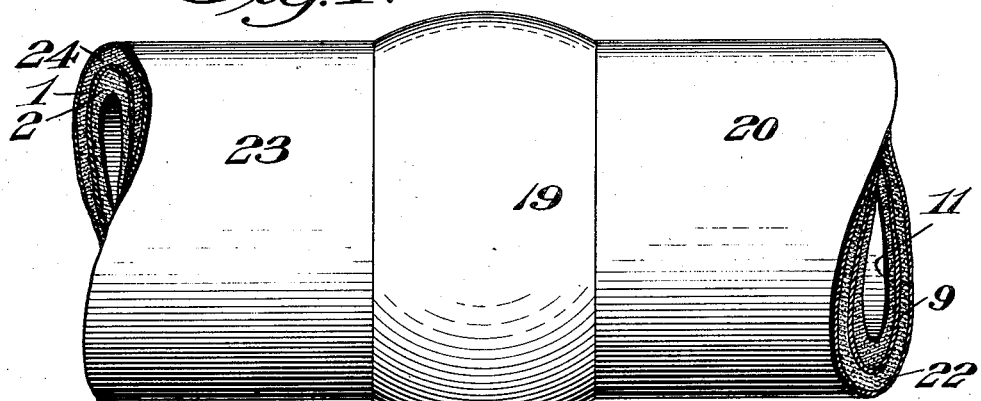
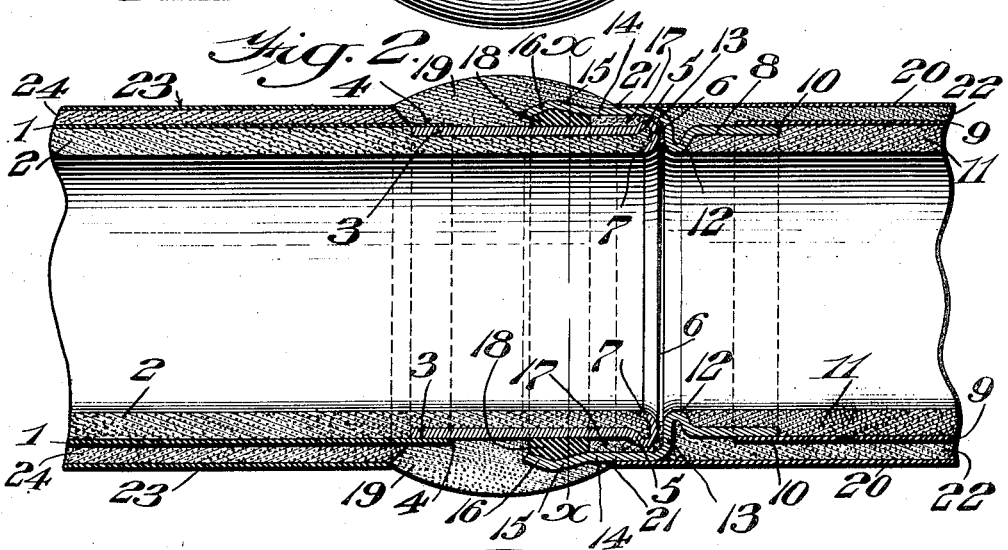
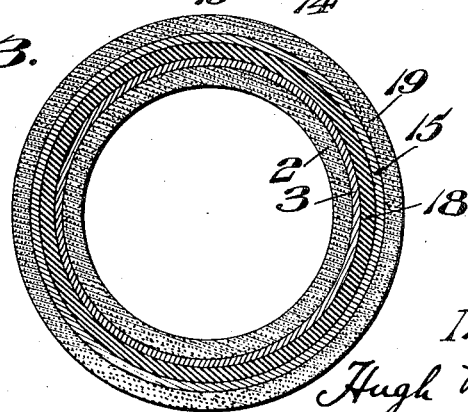

HUGH BAYARD HODGE, OF PHILADELPHIA, PENNSYLVANIA.

PIPE-JOINT COUPLING.

No. 922,480.     Specification of Letters Patent.     Patented May 25, 1909.

Application filed December 21, 1908. Serial No. 468,440.

*To all whom it may concern:*

Be it known that I, HUGH BAYARD HODGE, a citizen of the United States, residing in the city and county of Philadelphia, State of Pennsylvania, have invented a new and useful Pipe-Joint Coupling, of which the following is a specification.

It has heretofore been proposed in the manufacture of water pipe, to employ riveted sections of cement lined pipe wherein the jacket does not go out to the ends, in conjunction with couplings wherein cemented joints are employed, in which case it takes from three to four weeks after the joint is made before the cement is sufficiently hard to enable water to be put into the mains, which is a very objectionable feature in practice.

To avoid the objections above noted I have devised the present invention wherein a bell and socket joint or bell ring is employed, one of the joint members having one of its extremities welded to the pipe section while its other extremity is deflected outwardly and turned downwardly or inwardly. The other joint member has its outer extremity welded to the pipe section proper and its inner portion deflected downwardly then upwardly and over the juxtaposed terminal, and thence prolonged and extended upwardly and downwardly, the space between the joints being packed with yarn or similar material which is held in place by a lead joint, the outer portion of the bell ring having the outer jacket welded thereto, while over the bell ring, cement is placed after said lead joint is made, whereby it will be seen that the lead joint can be made at once, thus allowing the water to follow the laying of the pipe, so that pressure can be put on the main at once, which is a vast improvement over the old style of joints hereinbefore referred to.

To the above ends, my invention consists of a novel construction of pipe joint and its adjuncts as will be hereinafter particularly pointed out in the claims.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of the exterior of a joint embodying my invention. Fig. 2 represents a longitudinal section of Fig. 1. Fig. 3 represents a section on line $x$—$x$, Fig. 2.

Similar numerals of reference indicate corresponding parts in the figures.

Referring to the drawings. 1 designates a section of pipe of suitable material, interiorly lined with cement 2 or the like.

3 designates a coupling member which is welded or otherwise suitably secured at 4 to the pipe 2, the extremity of said coupling being deflected upwardly or outwardly at 5, thence interiorly at 6 and inwardly at 7, the lining of cement 2 being continued into the terminal of said coupling member, as will be understood from Fig. 2.

8 designates the bell member of the joint, the outer end of the latter having the pipe 9 welded thereto, at 10, and both said pipe and member 8 being interiorly lined with the cement 11. The member 8 is deflected interiorly as at 12, and thence extended outwardly as at 13, and then prolonged annularly as at 14, and thence enlarged as at 15 and thence contracted as at 16.

17 designates yarn which is suitably packed into the space between the members 3 and 14, said yarn after being firmly packed or driven into position being retained in place by the lead joint 18, which can be made at once, thus allowing the water to follow the laying of the pipe.

19 designates cement which is placed in position after the lead joint is made, the jacket 20 being welded to the coupling member 14 at about the point 21 and inclosing the cement 22, while the jacket 23 incloses the cement 24. The members 3 and 8 are preferably composed of wrought iron or medium steel, while the jackets 20 and 23 may be composed of wrought iron or other suitable material.

It will be apparent from the foregoing that my new construction of pipe and joint possesses numerous advantages over the prior art since the various metallic connections being welded there is initially, an absolutely water-tight pipe to start with and in my novel construction of joint, water can be let into the line at once before the pipe is covered up instead of having to wait from three to four weeks for the cement joint to harden which has heretofore been a very serious objection to the practical use of all former joints in which cement had to be used. By my novel construction I am also enabled to readily recalk the joints in case there is any slight leakage and furthermore, in my novel construction any person having any familiarity with the laying of cast iron pipe can lay this pipe equipped with my novel joint, whereas with a cement joint it is necessary to have specially trained men.

It will be apparent that the placing of the cement 19 around the joint after the lead 18 is poured acts as a protection to the exposed iron on the male ring 3, and that while I have specified the yarn as being used at the point indicated by the reference numeral 17 and lead as being indicated by 18, and cement by 19, I do not desire to be limited to these materials as their equivalents may be employed without departing from the spirit of my invention.

Having thus described my invention, what I claim as new and desire to secure by Letters Patent, is:—

1. In a device of the character described, pipe sections terminating in members juxtaposed to each other, the terminal of one of said members being inwardly deflected and the other of said members being also deflected inwardly, thence outwardly and then continued annularly, a packing disposed between said members, a metallic joint for holding said packing in place, and cement placed over said metallic joint and members.

2. In a device of the character described, pipe sections terminating in members juxtaposed to each other, said members being welded to the extremity of said sections, the terminal of one of said members being inwardly deflected and the other of said members being also deflected inwardly, thence outwardly, and then continued annularly, a packing disposed between said members, a metallic joint for holding said packing in place, and cement placed over said joint and members.

3. In a device of the character stated, cement lined pipe sections terminating in members juxtaposed to each other, the terminal of one of said members being enlarged and then inwardly deflected, the other of said members being also deflected inwardly, thence outwardly and thence continued annularly, a packing disposed between said members, a metallic joint between said members holding said packing in place, and cement inclosing said metallic joint.

4. In a device of the character described, cement lined pipe sections terminating in members welded thereto and having their ends juxtaposed to each other, cement inclosing said pipe sections and members, jackets inclosing said cement, one of said jackets being welded to one of said members, the terminal of one of said members being enlarged and then inwardly deflected, the other of said members being also deflected inwardly, thence outwardly and thence continued annularly, a packing disposed between said members, a lead joint between said members holding said packing in place, and cement inclosing said lead joint.

5. In a device of the character stated, an inner pipe section having a member welded thereto, a cement lining for said section and member, said member terminating in an enlarged and inwardly deflected terminal, a bell ring having a pipe section welded thereto, a cement lining for said section, said member having also an inwardly deflected portion, an annular extension, an enlarged portion and a terminal, a packing between the juxtaposed portions, a metallic joint holding said packing in place, and a cement lining surrounding said metallic joint and its adjuncts.

6. In a device of the character stated, an inner pipe section, having a member welded thereto, a cement lining for said section and member, said member terminating in an enlarged and inwardly deflected terminal, a bell ring having a pipe section welded thereto, a cement lining for said latter section, said ring having an inwardly deflected portion, an annular extension, an enlarged portion and a terminal, a packing between the juxtaposed annular terminals, a metallic joint holding said packing in place, a cement lining surrounding said metallic joint and its adjuncts, cement surrounding said pipe sections, and jackets surrounding said last-mentioned cement.

HUGH BAYARD HODGE.

Witnesses:
 W. H. ROTH,
 E. LYNDALL.